(12) United States Patent
Barra et al.

(10) Patent No.: US 11,022,240 B2
(45) Date of Patent: Jun. 1, 2021

(54) COOLING AND INSULATING MANIFOLD SEAL ASSEMBLY FOR A PROPULSION SYSTEM

(71) Applicant: General Electric Company, Schenectady, NY (US)

(72) Inventors: Apolinario Barra, Queretaro (MX); Daniel Drew Smith, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 814 days.

(21) Appl. No.: 15/620,060

(22) Filed: Jun. 12, 2017

(65) Prior Publication Data

US 2018/0355746 A1 Dec. 13, 2018

(51) Int. Cl.
| | |
|---|---|
| *F16L 17/02* | (2006.01) |
| *F16L 21/02* | (2006.01) |
| *F02M 31/20* | (2006.01) |
| *F02M 37/00* | (2006.01) |
| *F04D 29/58* | (2006.01) |
| *F04D 27/02* | (2006.01) |
| *F01D 25/18* | (2006.01) |
| *F02C 7/22* | (2006.01) |
| *F02C 7/047* | (2006.01) |

(Continued)

(52) U.S. Cl.
CPC ............ *F16L 17/02* (2013.01); *F01D 11/003* (2013.01); *F01D 11/005* (2013.01); *F01D 11/24* (2013.01); *F01D 25/183* (2013.01); *F02C 6/08* (2013.01); *F02C 7/047* (2013.01); *F02C 7/222* (2013.01); *F02M 31/20* (2013.01); *F02M 37/0011* (2013.01); *F04D 27/0215* (2013.01); *F04D 29/083* (2013.01); *F04D 29/584* (2013.01); *F16L 21/02* (2013.01); *C09D 127/12* (2013.01); *F05D 2230/642* (2013.01); *F05D 2260/231* (2013.01); *F05D 2300/43* (2013.01)

(58) Field of Classification Search
CPC ................................. F16L 17/02; F16L 21/02
USPC ................. 285/111–112, 235–236, 337, 339, 285/342–343
See application file for complete search history.

(56) References Cited

U.S. PATENT DOCUMENTS

| | | | | |
|---|---|---|---|---|
| 1,813,529 A | * | 7/1931 | Clark ...................... | F16L 21/04 285/342 |
| 2,269,695 A | * | 1/1942 | Scharf ..................... | F16L 19/08 285/53 |

(Continued)

*Primary Examiner* — Matthew Troutman
*Assistant Examiner* — Fannie C Kee
(74) *Attorney, Agent, or Firm* — Venable LLP; Elizabeth C. G. Gitlin; Michele V. Frank

(57) ABSTRACT

A seal assembly for a propulsion system couples a plurality of manifolds of a manifold assembly of the propulsion system generally in fluid communication. Each of the manifolds defines a first end and a second end. The seal assembly includes a coupling member attaching the first end and the second end of the manifold assembly together in fluid communication; one or more seals disposed between the coupling member and at least one of the first end and the second end of the manifold; and a retainer adjacent to the coupling member and the seal. The retainer defines a radial wall and an axial wall, in which the radial wall is extended generally from one or more of the first end and the second end of the manifold alongside the coupling member and the seal, and the axial wall is extended generally from the radial wall alongside the coupling member and the seal.

18 Claims, 5 Drawing Sheets

(51) Int. Cl.
  *F04D 29/08* (2006.01)
  *F01D 11/00* (2006.01)
  *F02C 6/08* (2006.01)
  *F01D 11/24* (2006.01)
  *C09D 127/12* (2006.01)

(56) References Cited

U.S. PATENT DOCUMENTS

| | | | | |
|---|---|---|---|---|
| 2,755,109 | A * | 7/1956 | Risley | F16L 19/086 |
| | | | | 285/232 |
| 2,787,479 | A * | 4/1957 | Burns | F16L 19/075 |
| | | | | 285/232 |
| 3,799,584 | A * | 3/1974 | Slocum | F16L 19/065 |
| | | | | 285/45 |
| 4,277,338 | A * | 7/1981 | Hoagland | B01D 35/12 |
| | | | | 210/186 |
| 4,410,186 | A * | 10/1983 | Pierce, Jr. | F16L 23/20 |
| | | | | 277/318 |
| 4,441,723 | A | 4/1984 | Greenwald | |
| 4,702,500 | A | 10/1987 | Thau, Jr. et al. | |
| 5,761,898 | A | 6/1998 | Barnes et al. | |
| 6,168,210 | B1 * | 1/2001 | Bird | F16L 21/04 |
| | | | | 285/337 |
| 8,647,048 | B2 | 2/2014 | Roberts et al. | |
| 9,488,110 | B2 | 11/2016 | Chan et al. | |
| 2010/0066032 | A1 | 3/2010 | Girman et al. | |
| 2016/0097477 | A1 * | 4/2016 | Spears | F16L 37/091 |
| | | | | 285/339 |
| 2016/0102608 | A1 | 4/2016 | Lynn | |
| 2016/0159489 | A1 | 6/2016 | Wilcox et al. | |
| 2016/0341056 | A1 | 11/2016 | Sutterfield et al. | |

* cited by examiner

COOLING AND INSULATING MANIFOLD SEAL ASSEMBLY FOR A PROPULSION SYSTEM

FIELD

The present disclosure relates to propulsion system manifolds. More specifically, the present disclosure relates to sealing systems for propulsion system manifolds.

BACKGROUND

Flexible elastomeric, polymeric, and composite duct seals are utilized generally as moveable or flexible joints to accommodate thermal expansion in manifolds and other walled conduits for propulsion systems. The elastomeric, polymeric, and composite component of the duct seal may generally permit movement or flexibility of the joints being connected. However, beyond certain temperature thresholds, the elastomeric, polymeric, and composite component degrades, causing volumetric change, compression set, and shrinkage, resulting in undesired leakage between the seal and the joints, or looseness resulting in undesired displacement of the joints or the seal, further resulting in undesired wear and cost, or joint liberation and propulsion system failure.

Thus, there is a need for a seal assembly and structure that may enable use of elastomeric, polymeric, and composite seals beyond increased temperature thresholds.

BRIEF DESCRIPTION

Aspects and advantages of the invention will be set forth in part in the following description, or may be obvious from the description, or may be learned through practice of the invention.

The present disclosure is directed to a seal assembly for a propulsion system. The seal assembly couples a plurality of manifolds of a manifold assembly of the propulsion system generally in fluid communication. Each of the manifold defines a first end and a second end. The seal assembly includes a coupling member attaching the first end and the second end of the manifold assembly together in fluid communication; one or more seals disposed between the coupling member and at least one of the first end and the second end of the manifold; and a retainer adjacent to the coupling member and the seal. The retainer defines a radial wall and an axial wall, in which the radial wall is extended generally from one or more of the first end and the second end of the manifold alongside the coupling member and the seal, and the axial wall is extended generally from the radial wall alongside the coupling member and the seal.

In one embodiment, the retainer is coupled to one or more of the manifolds of the propulsion system, the retainer defining a maximum lateral displacement of the coupling member, the seal, or both.

In various embodiments, the seal, the coupling member, the retainer, and the manifold together define a cooling circuit through which a fluid flows. In one embodiment, the cooling circuit is defined between the seal and the coupling member when the seal decreases in radius at or above a temperature threshold. In another embodiment, the seal defines a seal cooling passage extended through the seal in fluid communication with the cooling circuit. In yet another embodiment, the temperature threshold is based at least on an upper material limit of the seal, and wherein the material is an elastomeric, a polymeric, a composite, or combinations thereof. In still another embodiment, the retainer defines a cooling passage in fluid communication with the cooling circuit. In still yet another embodiment, the cooling passage is defined through one or more of the radial wall and the axial wall of the retainer.

In another embodiment, the retainer defines a metal reflective material.

In one embodiment, the retainer defines a metallic foil-encased thermal insulation, a fiber-reinforced rubber insulation, or a combination thereof.

In still another embodiment, the seal defines an elastomer material.

In still various embodiments, the retainer further defines a second axial wall extended from the radial wall of the retainer, the second axial wall adjacent to and coupled to the manifold. In one embodiment, the seal assembly further includes a clamp disposed around the second axial wall of the retainer, in which the clamp couples the retainer to the manifold at one or more of the first end and the second end of the manifold.

The present disclosure is further directed to a propulsion system including a manifold assembly defining a first end and a second end adjacent to the first end, the manifold assembly defining a retainer at the first end and the second end, in which the retainer defines a radial wall and an axial wall. The radial wall is coupled to each of the first end and the second end of the manifold assembly and extended generally along the radial direction therefrom, and the axial wall is extended generally from the radial wall alongside the coupling member and the seal generally along the axial direction. The propulsion system further includes a coupling member attaching the first end and the second end of the manifold assembly together in fluid communication, in which the retainer is adjacent to the coupling member at the first end and the second end. The propulsion system still further includes a plurality of seals, at least one disposed on each of the first end and the second end of the manifold assembly, and wherein each seal is surrounded by the coupling member along an axial direction and a radial direction In various embodiments of the propulsion system, the retainer is integral to manifold assembly, the retainer defining a maximum lateral displacement of the coupling member, the seal, or both. In one embodiment, the retainer further defines a second axial wall extended from the radial wall of the retainer, the second axial wall adjacent to and integral to one or more of the first manifold at the first end and the second manifold at the second end.

In still various embodiments of the propulsion system, the seal, the coupling member, the retainer, and the manifold assembly together define a cooling circuit through which a fluid flows. In one embodiment, the retainer defines a cooling passage in fluid communication with the cooling circuit, and wherein the cooling passage is defined through one or more of the radial wall and the axial wall of the retainer. In another embodiment, the manifold assembly defines a groove between the seal and the manifold assembly, and the cooling circuit is further defined between the seal and the manifold assembly.

In still another embodiment of the propulsion system, the retainer defines a metallic foil-encased thermal insulation, a fiber-reinforced rubber insulation, or a combination thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
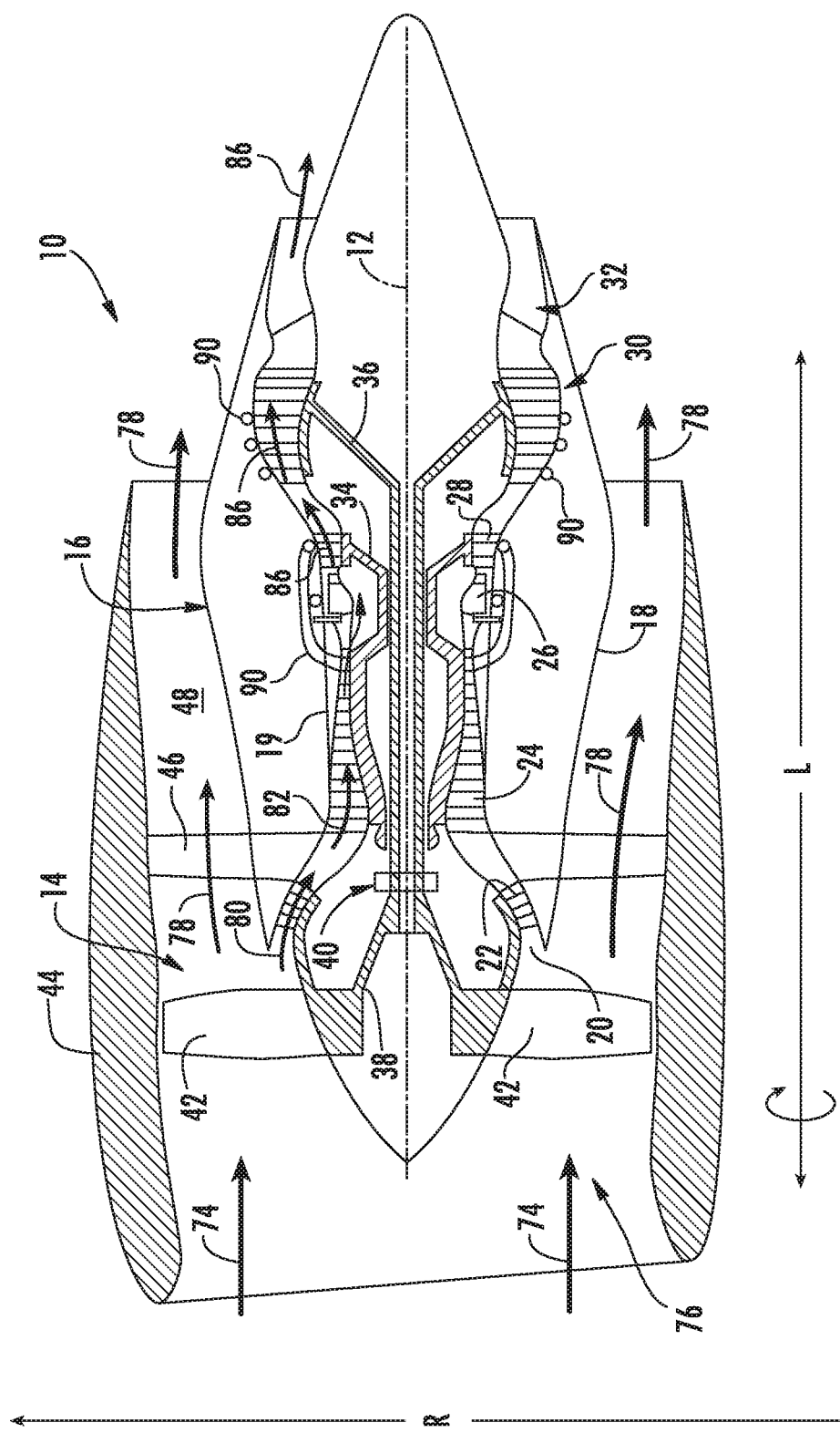
FIG. 1 is a schematic view of a propulsion system in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A sealing system is generally provided that may enable use of elastomeric, polymeric, and composite seals beyond increased temperature thresholds on propulsion systems. The sealing system generally defines an insulation-directed cooling circuit through and around the seal, coupling member, retainer, and manifold and also providing thermal attenuation properties in the retainer. The seal assembly may prolong life of the seal, the coupling member, and the seal assembly in general, thereby improving time-on-wing of the propulsion system to which the seal assembly is attached, mitigating sealing assembly wear, deterioration, and failure, and generally improving engine efficiency through reduced leakage.

Referring now to the drawings, FIG. 1 is a schematic partially cross-sectioned side view of an exemplary engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes and generally along a longitudinal direction L. The engine 10 further defines a radial direction R extended from the axial centerline 12, and a circumferential direction C around the axial centerline 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. The compressor section, the combustion section 26, the turbine section, and the exhaust nozzle section 32 together at least partially define a core flowpath through the engine 10. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the core flowpath into the LP compressor 22. Air 80 is progressively compressed as it flows through the LP and HP compressors 22, 24 towards the combustion section 26. The now compressed air as indicated schematically by arrows 82 flows through the combustion section 26.

Referring still to FIG. 1, the combustion gases 86 generated in the combustion section 26 flow into the HP turbine 28, thus causing the HP rotor shaft 34 to rotate, thereby supporting operation of the HP compressor 24. The combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Furthermore during operation of the engine 10, a volume of air is extracted from the core flowpath through a plurality of manifolds coupled together into a manifold assembly 90, such as walled conduits, tubes, or pipes, for various purposes, such as cooling flow to the combustion section 26 or the turbine section, such as to an active clearance control (ACC) system, or to a thermal management system (TMS), such as an environmental control system (ECS) or anti-icing systems, or air management subsystems (AMS), such as for bleed ducts, or for other purposes as may require a volume of air or other fluid. Still further, during operation of the engine 10, a fluid, such as air, inert gas, fuel, oil, hydraulic, water, etc., may flow through the plurality of manifolds or manifolds 90 among various systems, such as to provide thermal attenuation or heat exchange between fluids (e.g., air/oil coolers, fuel/oil coolers, fuel heating, etc.), or to provide a fluid to various components or sections, such as oil to bearings within the compressor section or turbine section, or fuel to the combustion section.

The engine 10 may generally include one or more cases 19 surrounding one or more of the compressor section, including one or more of the LP compressor 22 and the HP compressor 24, the combustion section 26, and the turbine section, including the HP turbine 28 and the LP turbine 30. The cases 19 may each generally define a wall or shroud at least partially defining the core flowpath covering the airfoils of one or more of the aforementioned sections, or generally providing a pressure vessel (e.g., the combustion section 26). The cases 19 may further define a secondary flowpath around the core flowpath such as to distribute or re-distribute fluid for heat transfer, actuation, performance, or operability purposes. The manifold assembly 90 may generally be coupled to one or more of the cases 19, from which a fluid may transfer to or from the core flowpath, secondary flowpath, or bearings, fuel manifolds, hydraulic or lube services, etc.

Figure 2:
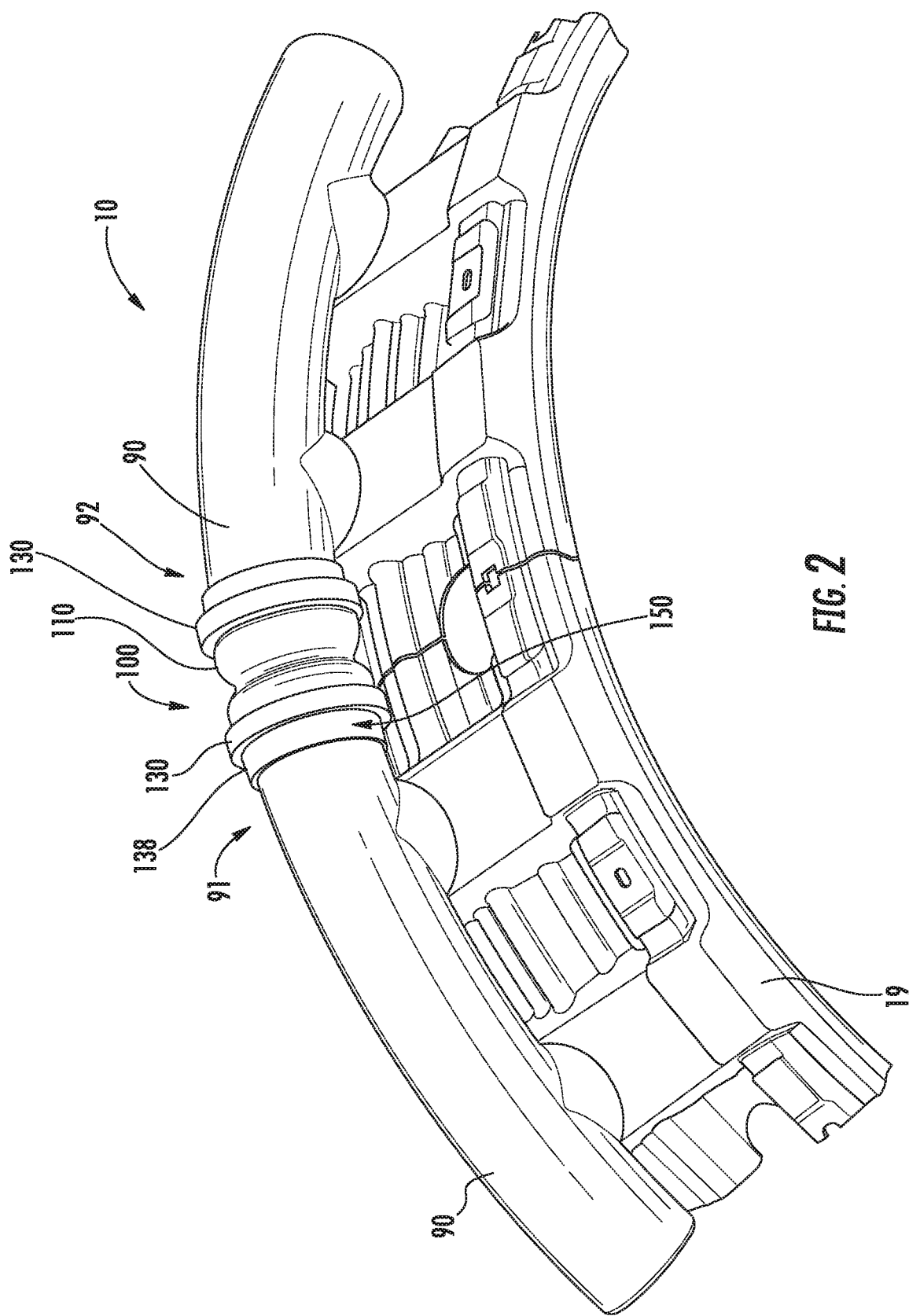
FIG. 2 is a perspective view of an exemplary embodiment of a seal assembly attaching a manifold of the propulsion system shown in FIG. 1.

As such, in various embodiments, such as generally provided in FIG. 2, a plurality of manifolds, such as two or more manifolds, may define the manifold assembly 90 coupled in fluid communication by a seal assembly 100. The seal assembly 100 generally includes a coupling member 110 attaching or coupling a first end 91 of the manifold assembly 90 and a second end 92 of the manifold assembly 90 together in fluid communication. The seal assembly 100 generally provides fluid communication between two or more manifolds 90, such as a first manifold defining the first end 91 and a second manifold defining the second end 92, while generally restricting, limiting, or otherwise sealing the fluid (e.g., air, inert gas, fuel, oil or lubes generally, hydraulic fluid, etc., or combinations thereof) within the manifolds 90.

For example, in one embodiment, the manifold assembly 90 is defined generally circumferentially around the engine 10, in which the first end 91 and the second end 92 are adjacent along the circumferential direction C and the seal assembly 100 couples the first end 91 and the second end 92 of the manifold assembly 90. The manifold assembly 90 may include a single manifold or pipe split at a circumferential location to define the first end 91 and the second end 92. In other embodiments, the manifold assembly 90 may include two or more manifolds coupled or attached together by a plurality of the seal assembly 100 at various circumferential, radial, and/or axial locations of the plurality of manifolds 90.

Figure 3:
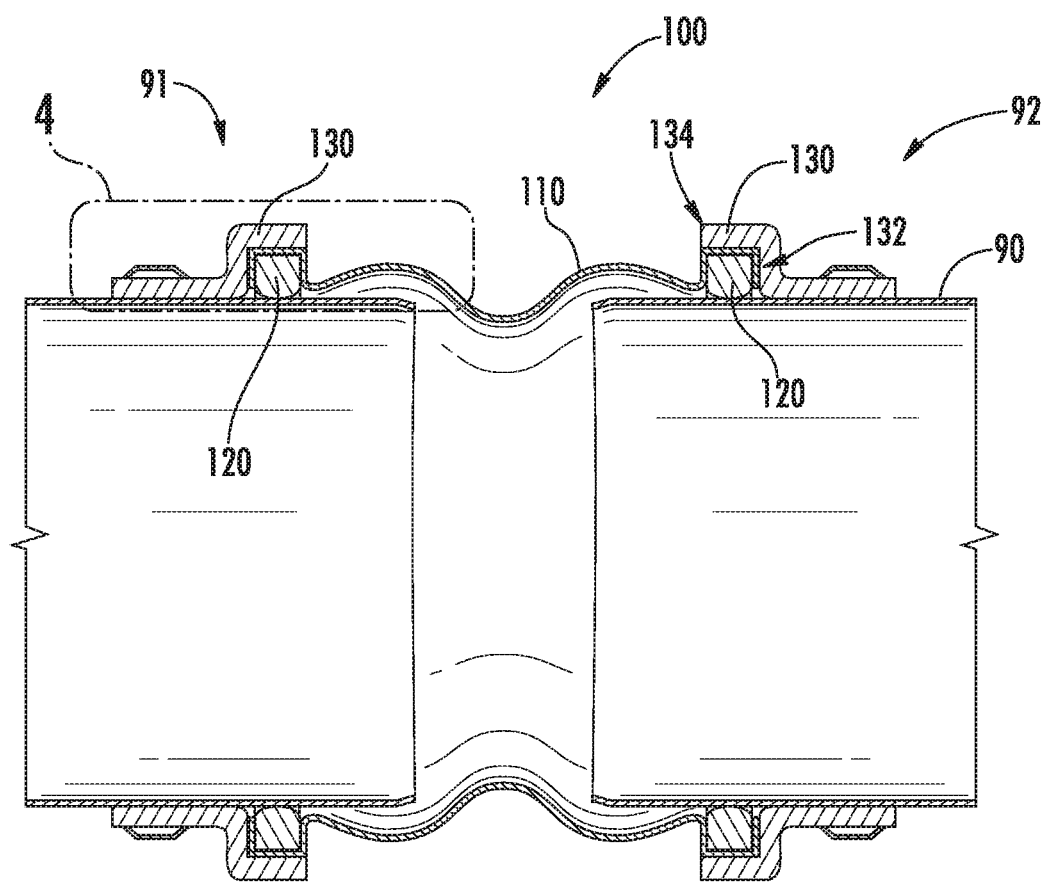
FIG. 3 is a cross sectional side view of an exemplary embodiment of the seal assembly shown in FIG. 2.
Figure 4:
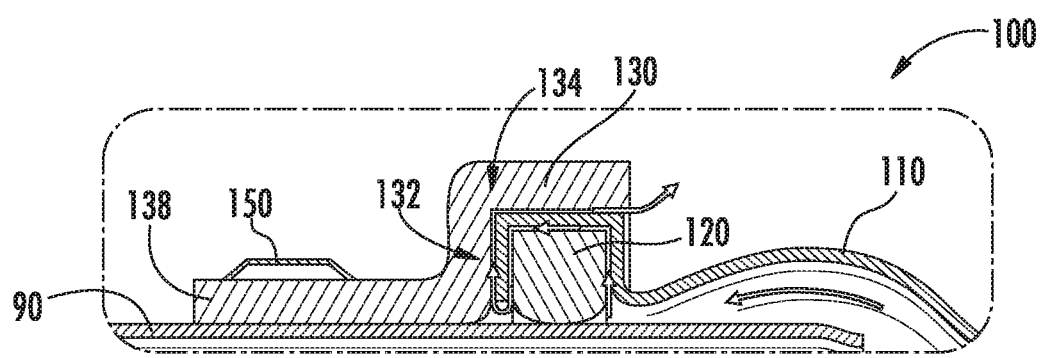
FIG. 4 is a close-up cross sectional side view of a portion of the seal assembly shown in FIG. 3.
Figure 5:
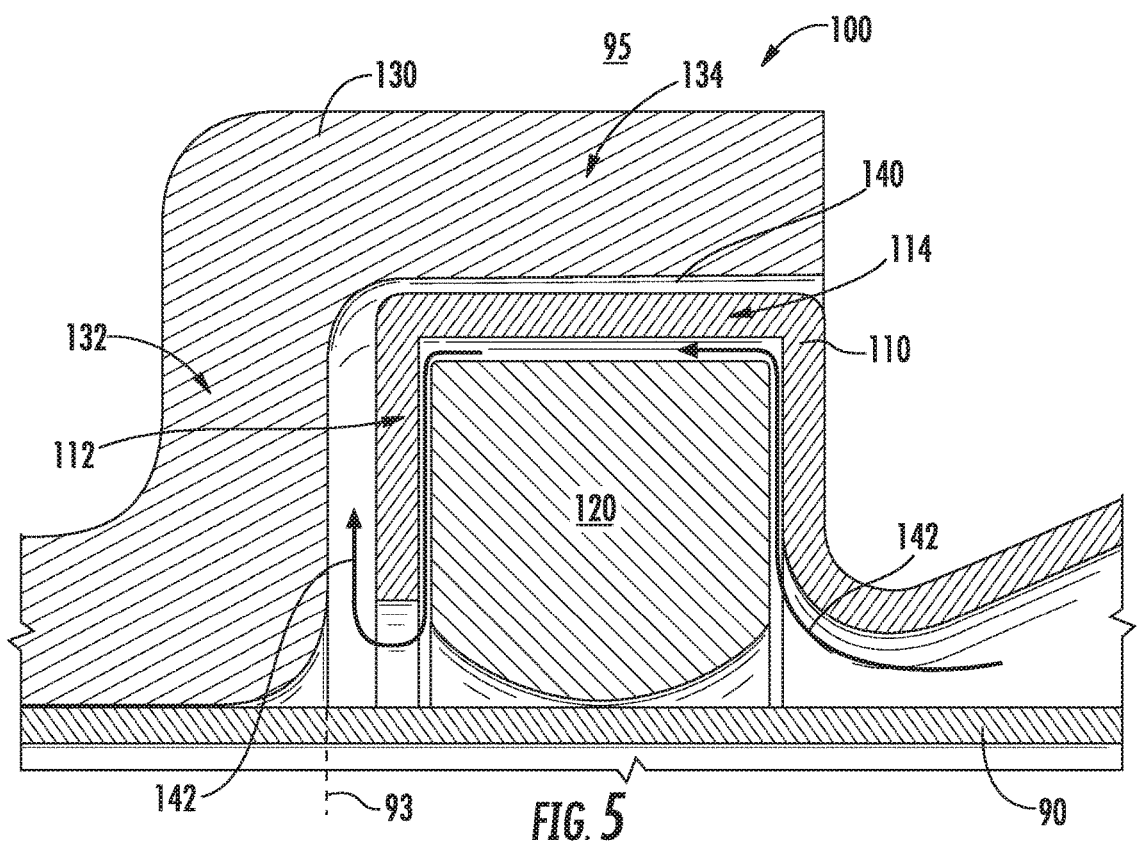
FIG. 5 is a cross sectional side view of a portion of an embodiment of the seal assembly shown in FIG. 3.

Referring now to FIGS. 3-4, a cross sectional side view of the seal assembly 100 and the manifold assembly 90 of FIG. 2 are generally provided. In various embodiments, the seal assembly 100, or more specifically, the coupling member 110 defines a flexible coupling, such as an alignment joint or a thermal expansion joint, or a duct seal, such as, but not limited to, a Peri Seal.

The seal assembly 100 further includes one or more seals 120 disposed between the coupling member 110 and at least one of the first end 91 and the second end 92 of the manifold assembly 90. In various embodiments, the seal 120 defines a seal ring or a rope seal disposed around the manifold assembly 90. In one embodiment, the seal 120 is an elastomeric, polymeric, and composite seal. For example, the seal may be an elastomeric seal for a seal assembly such as a Peri Seal assembly. In various embodiments, the seal defines one or more polymers, such as a fluoropolymer, such as a polytetrafluoroethylene (PTFE) or reinforced PTFE (e.g., Teflon), a polyaryletherketone (PAEK), such as polyetheretherketone (PEEK), an ethyl propylene or ethyl propylene rubber (EPDM), or one or more saturated rubbers, such as a fluoroelastomer, a fluorosilicone, a silicone elastomer, a urethane elastomer, or other polymer-based material. In various embodiments, the seal defines one or more packing rings or ropes made from carbon, graphite, PTFE/graphite, aramid, flax, acrylic, flexible graphite, novoloid, or other composite sealing material.

Referring now to FIGS. 2-4, the seal assembly 100 further includes one or more of a retainer 130 adjacent to the coupling member 110 and the seal 120. The retainer 130 is disposed at one or more of the first end 91 of the manifold assembly 90 and the second end 92. The retainer 130 includes a radial wall 132 extended generally from one or more of the first end 91 and the second end 92 of the manifold assembly 90 adjacent to or alongside the coupling member 110 and the seal 120. The retainer 130 further includes an axial wall 134 extended generally from the radial wall 132 and adjacent to or alongside the coupling member 110 and the seal 120.

In various embodiments, the retainer 130 is coupled to one or more of the manifolds 90 such as to define a maximum lateral displacement of the coupling member 110, such as depicted at plane 93 extended from the radial wall 132 of the retainer 130. For example, in the embodiment shown in FIGS. 2-4, in which the seal assembly 100 is coupled to the manifold assembly 90 extended circumferentially around the outer casing 18 of the engine 10, the retainer 130 may limit maximum lateral displacement along the circumferential direction C. In various other embodiments, in which the manifold assembly 90 is coupled at the first end 91 and the second end 92 along the radial direction R, or longitudinal direction L, or combinations thereof, the retainer 130 defines a maximum lateral displacement generally along one or more of those directions. Generally, the retainer 130, or a pair thereof, enable movement of the seal assembly 100, the manifold assembly 90, or other while providing a maximum lateral displacement to limit an undesired tension or liberation (e.g., breakage) of the seal assembly 100 or de-coupling of the first end 91 and second end 92 of the manifold assembly 90.

Referring still to FIGS. 2-4, the retainer 130 may define an insulating material to provide thermal attenuation at the coupling member 100 or, more specifically, the seal 120. In one embodiment, the retainer 130 defines a metal reflective material, such as, but not limited to, a steel, an aluminum, a silver, or alloys of each, or combinations thereof. In another embodiment, the retainer defines a metallic foil-encased thermal insulation, a fiber-reinforced rubber insulation, or a combination thereof. As such, the retainer 130 may mitigate transfer of thermal energy from a heat source, shown schematically as area 95 outside of the manifold assembly 90, to the seal 120 of the seal assembly 100.

Referring now to FIGS. 2-5, during operation of the engine 10, the heat source 95 may induce shrinkage of the seal 120. For example, in various embodiments of seals, degradation, compression set, shrinkage, wear, volumetric change and deformation, or general deterioration may be induced when a temperature threshold based on the material of the seal is reached or surpassed. In one embodiment, such threshold is at approximately 80 degrees Celsius or higher. In other embodiments, such deterioration may be induced at approximately 100 degrees Celsius or higher. In still other embodiments, such deterioration may be induced at approximately 260 degrees Celsius or higher. As the seal 120 deteriorates, the seal assembly 100 defines a cooling circuit 140 between the seal 120 and the coupling member 110, and between the coupling member 110 and the retainer 130. For example, in one embodiment, the coupling member 110 defines a radial coupling wall 112 generally adjacent to the radial wall 132 of the retainer 130 and an axial coupling wall 114 adjacent to the axial wall 134. As another example, the radial coupling wall 112 may be disposed generally parallel to the radial wall 132 of the retainer 130. As yet another example, the axial coupling wall 114 may be disposed generally parallel to the axial wall 134 of the retainer 130. The cooling circuit 140 may extend from between the manifold assembly 90 and the coupling member 110 to between the seal 120 and the axial coupling wall 114 and the radial coupling wall 112 of the coupling member, and from between the radial coupling wall 112 and radial wall 132 of the retainer 130, and between the axial coupling wall 114 and the axial wall 134 of the retainer 130, and generally vent to an ambient condition, such as to the heat source 95.

Shrinkage of the seal 120 disposed between the manifold assembly 90, the axial coupling wall 114, and the radial coupling wall 112 of the coupling member 100 may increase a cross sectional area of the cooling circuit 140 and therefore increase a quantity of flow of the fluid, shown schematically by arrows 142, through the cooling circuit 140. The fluid 142 is generally cooler than the heat source 95. As such, the cooling circuit 140 and the fluid 142 passing therethrough may mitigate shrinkage, wear, or deterioration of the seal 120.

Figure 6:
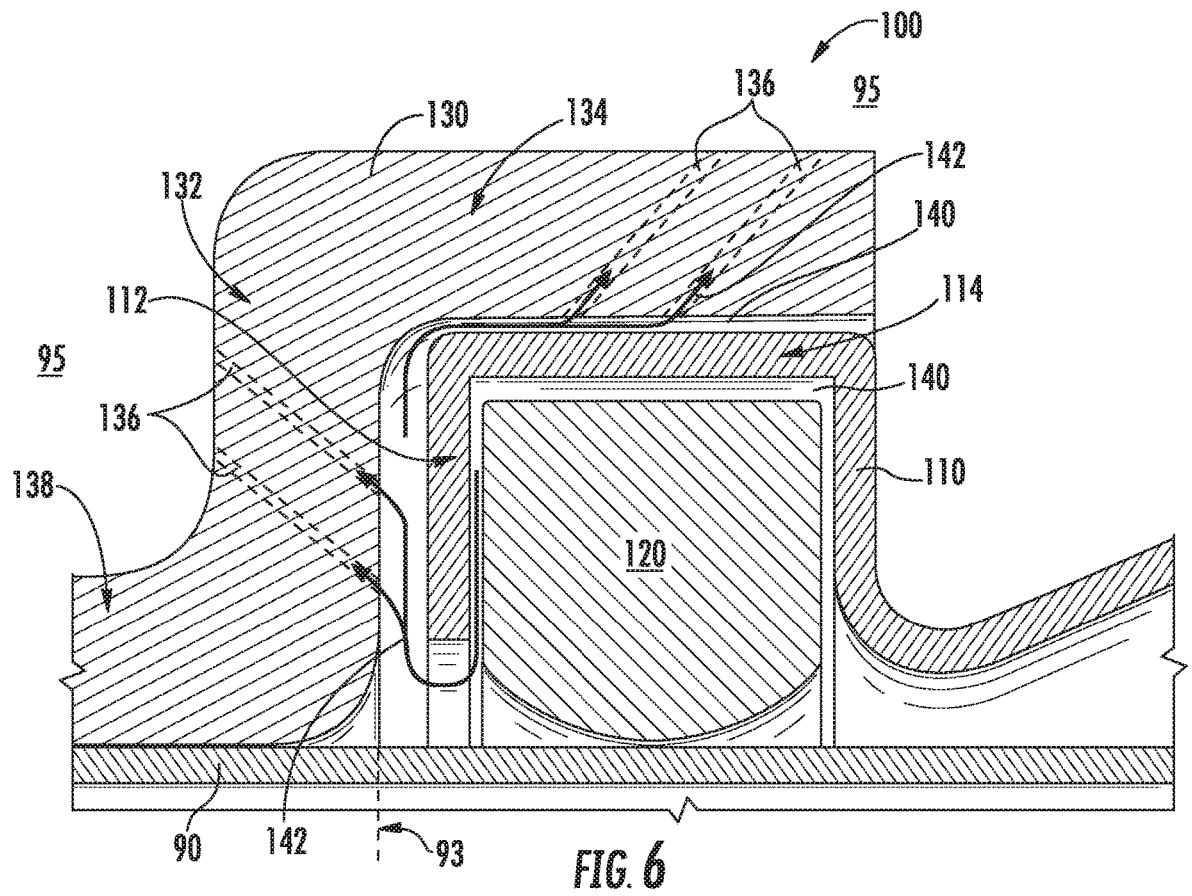
FIG. 6 is a cross sectional side view of a portion of another embodiment of the seal assembly shown in FIG. 3.

Referring now to FIG. 6, the seal assembly 100 generally provided may be configured substantially similarly to the seal assembly 100 shown and described in regard to FIGS. 1-5. However, in FIG. 6, the seal assembly 100 further defines a cooling passage 136 extended through the retainer 130. The cooling passage 136 extends generally from the cooling circuit 140 to the heat source 95 or other environmental generally outward of the retainer 130. In one embodiment, the cooling passage 136 extends through the radial wall 132 of the retainer 130. In another embodiment, the cooling passage 136 extends through the axial wall 134 of the retainer 130. As generally provided, the cooling passage 136 may be disposed at an angle relative to a direction of flow of the fluid 142 through the cooling circuit 140. However, it should be appreciated that in other embodiments, the cooling passage 136 may be defined substantially straight through the retainer 130, such as parallel to the manifold assembly 90 through the radial wall 132 or perpendicular to the manifold assembly 90 through the axial wall 134. In still various embodiments, the cooling passage 136 may define a serpentine structure through the retainer 130.

Referring still to FIG. 6, in conjunction with FIGS. 1-5, the seal assembly 100 may further include a second axial wall 138 extended from the radial wall 132 of the retainer 130. The second axial wall 138 is adjacent to and coupled to the manifold assembly 90. In various embodiments, the retainer 130 is integral to the manifold assembly 90. For example, in one embodiment, the second axial wall 138 of the retainer 130 is integral to the manifold assembly 90. In another embodiment, the radial wall 132 extends from the manifold assembly 90 and is integral thereto. For example, in still various embodiments, the retainer 130 and the manifold assembly 90 may be formed integrally through additive manufacturing.

Figure 7:
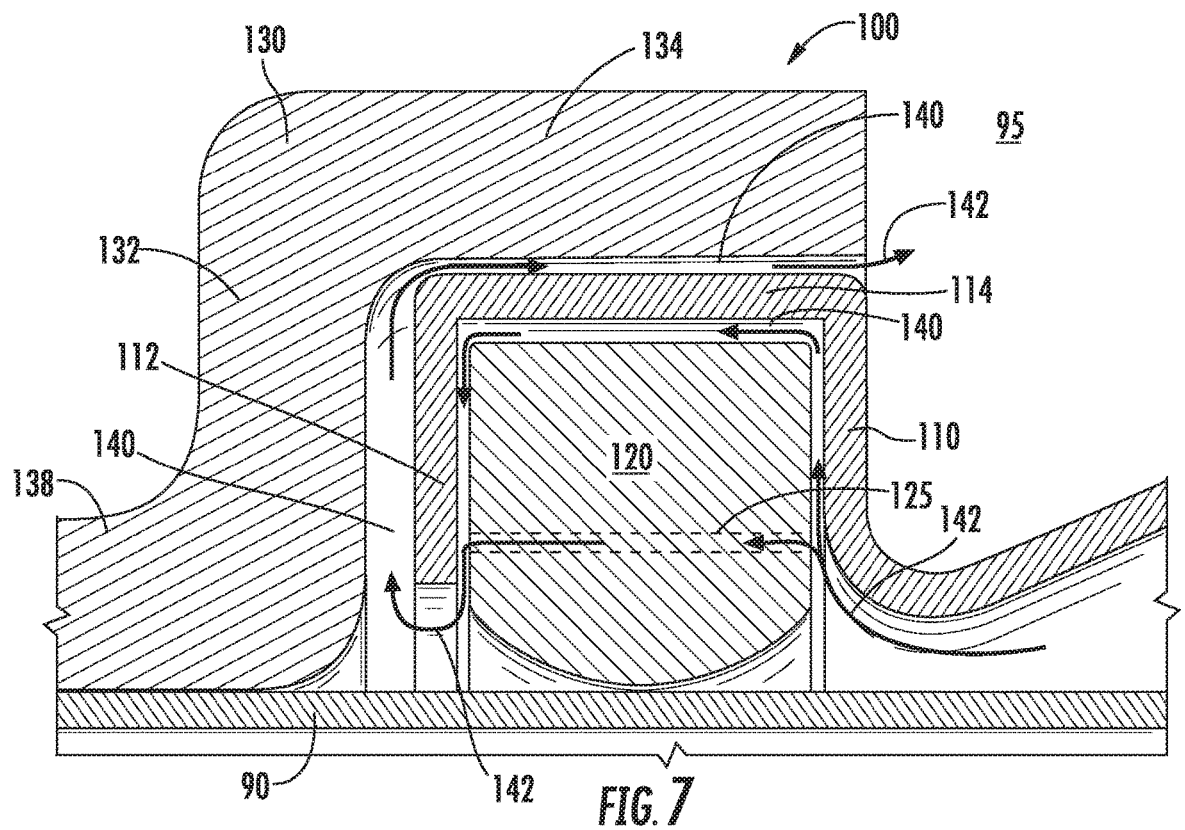
FIG. 7 is a cross sectional side view of a portion of yet another embodiment of the seal assembly shown in FIG. 3.

Referring now to FIG. 7, the seal assembly 100 generally provided may be configured as shown and described in regard to FIGS. 1-6. In FIG. 7, the seal 120 defines a seal cooling passage 125 extended through the seal 120 in fluid communication with the cooling circuit 140. The seal cooling passage 125 may define a generally cylindrical bore through the seal 120 in fluid communication with the cooling circuit 140. The seal cooling passage 125 may be proximate at a first end to the retainer 130 and at a second end through the seal 120 opposite of the first end. The seal cooling passage 125 at both ends is in fluid communication with the cooling circuit 140. In various embodiments, the seal cooling passage 125 defines a serpentine structure, or is angled relative to the manifold assembly 90.

Figure 8:
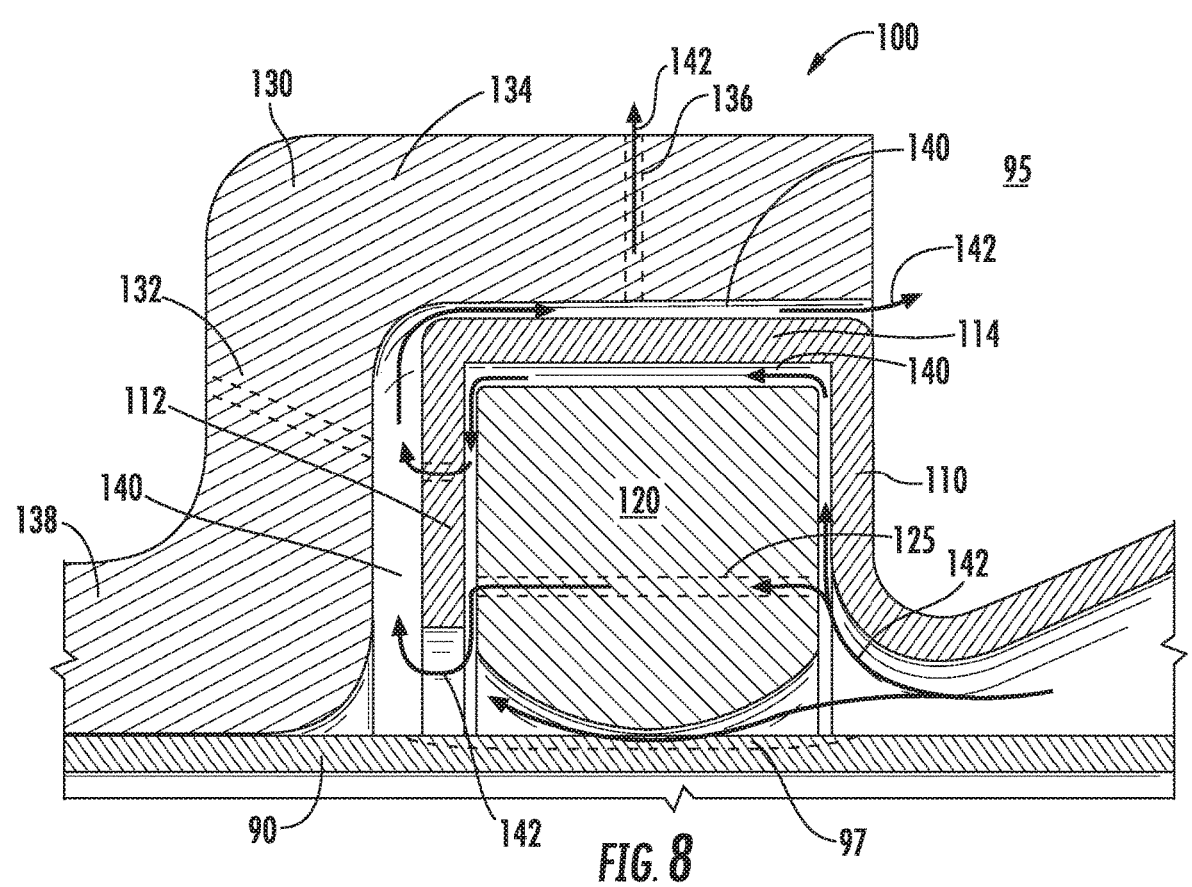
FIG. 8 is a cross sectional side view of a portion of still another embodiment of the seal assembly shown in FIG. 3.

Referring now to FIG. 8, the seal assembly 100 generally provided may be configured as shown and described in regard to FIGS. 1-7. However, in FIG. 8, the engine 10 including the seal assembly 100 define a groove 97 in the manifold assembly 90 under or radially inward of the seal 120. The groove 97 may generally define a trench or passage that permits a flow of the fluid 142 under the seal 120. As such, the seal assembly 100 and the engine 10 further define the cooling circuit 140 between the seal 120 and the manifold assembly 90.

In another embodiment as generally provided in FIG. 8, the radial coupling wall 112 may include one or more passages through which the fluid 142 may pass. As such, further cooling may occur at the coupling member 110 in addition to the seal 120 and the retainer 130.

In various embodiments, the retainer 130 is mechanically joined or fastened to the manifold assembly 90. For example, in one embodiment, the retainer 130, such as at the second axial wall 138, the radial wall 132, or both, are welded, brazed, soldered, or otherwise bonded to the manifold assembly 90. In another embodiment, one or more mechanical fasteners, such as, but not limited to, screws, bolts, nuts, clamps, studs, rivets, etc. For example, in various embodiments, such as shown in FIG. 2, the seal assembly 100 may further include a clamp 150 disposed around the second axial wall 138 of the retainer 130. In such an embodiment, the clamp 150 may be re-fitted to adjust the maximum lateral displacement 93 position of the retainer 130 along the manifold assembly 90. In still other embodiments, the retainer 130 is integrally formed or machined into the manifold assembly 90, such as by additive manufacturing, casting, or various machining processes, or combinations thereof.

The sealing system 100 shown and described in regard to FIGS. 1-8 may define a generally self-cooling, insulating, or passive thermal attenuation structure to promote structural longevity of the seal 120, the coupling member 110, and the manifold assembly 90 to which the seal assembly 100 is coupled. The sealing system 100 may further enable use of seals 120, such as elastomeric, polymeric, and composite seals, beyond increased temperature thresholds on propulsion systems 10. The temperature threshold is generally based on the material of the seal 120, such as an upper limit of the seal 120 defining an elastomeric, a polymeric, or composite material, or combinations thereof. The sealing system 100 generally defines an insulation-directed cooling circuit 140 through and around the seal 120, the coupling member 110, the retainer 130, and the manifold assembly 90 while also providing thermal attenuation properties in the retainer 130, mitigating heat transfer to the seal 120. The seal assembly 100 may reduce an operating temperature of the seal 120 and prolong life of the seal 120, the coupling member 110, and the seal assembly 100 in general, thereby improving time-on-wing of the propulsion system 10 to which the seal assembly 100 is attached, mitigating sealing assembly wear, deterioration, and failure, and generally improving engine efficiency through reduced leakage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a propulsion system, comprising:
   a coupling member configured to attach a first end and a second end of a manifold assembly of the propulsion system together in fluid communication;
   a seal configured to be disposed between the coupling member and at least one of the first end and the second end of the manifold assembly; and
   a retainer adjacent to the coupling member and the seal, wherein the retainer defines a radial wall, a first axial wall, and a second axial wall,
   wherein the radial wall extends generally from one of the first end and the second end of the manifold assembly alongside the coupling member and the seal,
   wherein the first axial wall extends generally from the radial wall alongside the coupling member and the seal,
   wherein the second axial wall extends from the radial wall of the retainer, the second axial wall adjacent to and coupled to the manifold assembly,
   wherein at least a portion of the coupling member and the seal are sandwiched between the first axial wall and the manifold assembly in a radial direction, and
   wherein the radial wall is disposed adjacent to a radial portion of the coupling member and positioned axially outside the coupling member.

2. The seal assembly of claim 1,
   wherein the retainer is configured to be coupled to the manifold assembly of the propulsion system, and
   wherein the retainer defines a maximum lateral displacement of the coupling member, the seal, or both.

3. The seal assembly of claim 1, wherein the seal, the coupling member, the retainer, and the manifold assembly together define a cooling circuit through which a fluid flows.

4. The seal assembly of claim 3, wherein the cooling circuit is defined between the seal and the coupling member when the seal decreases in radius at or above a temperature threshold.

5. The seal assembly of claim 4, wherein the seal defines a seal cooling passage extended through the seal in fluid communication with the cooling circuit.

6. The seal assembly of claim 4, wherein the temperature threshold is based at least on an upper material limit of the seal, and wherein the material is an elastomeric, a polymeric, a composite, or combinations thereof.

7. The seal assembly of claim 4, wherein the retainer defines a cooling passage in fluid communication with the cooling circuit.

8. The seal assembly of claim 7, wherein the cooling passage is defined through one or more of the radial wall and the first axial wall of the retainer.

9. The seal assembly of claim 1, wherein the retainer defines a metal reflective material.

10. The seal assembly of claim 1, wherein the retainer defines a metallic foil-encased thermal insulation, a fiber-reinforced rubber insulation, or a combination thereof.

11. The seal assembly of claim 1, wherein the seal defines an elastomer material.

12. The seal assembly of claim 1, the seal assembly further comprising:
    a clamp disposed around the second axial wall of the retainer,
    wherein the clamp is configured to couple the retainer to the manifold assembly at one or more of the first end and the second end of the manifold assembly.

13. A propulsion system comprising:
    a manifold assembly defining a first end and a second end adjacent to the first end;
    a coupling member attaching the first end and the second end of the manifold assembly together in fluid communication; and
    a first seal disposed on the first end of the manifold assembly, and a second seal disposed on the second end of the manifold assembly,
    wherein the manifold assembly defines a first retainer at the first end and a second retainer at the second end,
    wherein the first retainer defines a first radial wall, a first axial wall, and a first secondary axial wall, and the second retainer defines a second radial wall, a second axial wall, and a second secondary axial wall,
    wherein the first radial wall is coupled to the first end of the manifold assembly and extends generally along a radial direction therefrom,
    wherein the second radial wall is coupled to the second end of the manifold assembly and extends generally along the radial direction therefrom,
    wherein the first axial wall extends generally from the first radial wall alongside the coupling member and the first seal generally along an axial direction,
    wherein the second axial wall extends generally from the second radial wall alongside the coupling member and the second seal generally along the axial direction,
    wherein the first secondary axial wall extends from the first radial wall of the first retainer and is adjacent to and integral to the manifold assembly at the first end, wherein the second secondary axial wall extends from the second radial wall of the second retainer and is adjacent to and integral to the manifold assembly at the second end, wherein the first retainer is adjacent to the coupling member at the first end, and the second retainer is adjacent to the coupling member at the second end, wherein each of the first and second seals is surrounded by the coupling member along the axial direction and the radial direction, wherein at least a portion of the coupling member and the first seal are sandwiched between the first axial wall and the manifold assembly in the radial direction, wherein at least a portion of the coupling member and the second seal are sandwiched between the second axial wall and the manifold assembly in the radial direction, wherein the first radial wall is disposed adjacent to a first radial portion of the coupling member and positioned axially outside the coupling member, and wherein the second radial wall is disposed adjacent to a second radial portion of the coupling member and positioned axially outside the coupling member.

14. The propulsion system of claim 13,
wherein the first retainer is integral to the manifold assembly, and defines a maximum lateral displacement of the coupling member, the first seal, or both, and
wherein the second retainer is integral to the manifold assembly, and defines a maximum lateral displacement of the coupling member, the second seal, or both.

15. The propulsion system of claim 13, wherein the first and second seals, the coupling member, the first and second retainers, and the manifold assembly together define a cooling circuit through which a fluid flows.

16. The propulsion system of claim 15,
wherein the first retainer defines a first cooling passage in fluid communication with the cooling circuit,
wherein the first cooling passage is defined through one or more of the first radial wall and the first axial wall of the first retainer,
wherein the second retainer defines a second cooling passage in fluid communication with the cooling circuit, and
wherein the second cooling passage is defined through one or more of the second radial wall and the second axial wall of the second retainer.

17. The propulsion system of claim 15,
wherein the manifold assembly defines a first groove between the first seal and the manifold assembly,
wherein the manifold assembly defines a second groove between the second seal and the manifold assembly, and
wherein the cooling circuit is further defined between each of the first and second seals and the manifold assembly.

18. The propulsion system of claim 13,
wherein each of the first and second retainers defines a metallic foil-encased thermal insulation, a fiber-reinforced rubber insulation, or a combination thereof.

* * * * *